(12) United States Patent
Bergano et al.

(10) Patent No.: US 7,187,860 B2
(45) Date of Patent: Mar. 6, 2007

(54) METHOD AND APPARATUS FOR DETECTING LOCALIZED POLARIZATION DEPENDENT ANOMALIES ON OPTICAL TRANSMISSION LINES

(75) Inventors: Neal S. Bergano, Lincroft, NJ (US); Cleo D. Anderson, Colts Neck, NJ (US); William W. Patterson, Freehold, NJ (US); Richard L. Maybach, Holmdel, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 560 days.

(21) Appl. No.: 10/117,718

(22) Filed: Apr. 5, 2002

(65) Prior Publication Data
US 2002/0149823 A1 Oct. 17, 2002

Related U.S. Application Data

(60) Provisional application No. 60/282,071, filed on Apr. 6, 2001.

(51) Int. Cl.
*H04B 10/00* (2006.01)
(52) U.S. Cl. .................... 398/9; 398/10; 398/13

(58) Field of Classification Search ............ 398/140, 398/147, 152, 158–159, 182–201, 9–38
See application file for complete search history.

(56) References Cited

U.S. PATENT DOCUMENTS

| 5,202,746 | A | * | 4/1993 | Sentsui et al. | 356/73.1 |
|---|---|---|---|---|---|
| 6,330,383 | B1 | * | 12/2001 | Cai et al. | 385/37 |
| 6,396,575 | B1 | * | 5/2002 | Holland | 356/73.1 |
| 6,650,846 | B1 | * | 11/2003 | Ito | 398/184 |

FOREIGN PATENT DOCUMENTS

EP 0 784 391 A2 7/1997

OTHER PUBLICATIONS

European Search Report dated Oct. 22, 2004 for European Application No. 02252457.3-1246.
CA Sanggeon Lee et al., "All-Optical Remote Location of High PMD Fiber Spans", USC—Office of Technology Licensing, File # 2971.

* cited by examiner

Primary Examiner—Agustin Bello
(74) Attorney, Agent, or Firm—Grossman, Tucker, Perreault & Pfleger, PLLC

(57) ABSTRACT

The position and amount of localized polarization dependent anomalies such as polarization mode dispersion and/or polarization dependent loss may be measured by applying a polarization modulated probe signal to an optical transmission line. The polarization modulated probe signal is returned via optical feedback paths positioned along the line, and is detected by a probe signal receiver to identify the position and strength of the anomaly.

26 Claims, 7 Drawing Sheets

METHOD AND APPARATUS FOR DETECTING LOCALIZED POLARIZATION DEPENDENT ANOMALIES ON OPTICAL TRANSMISSION LINES

CROSS REFERENCE TO RELATED APPLICATIONS

The present application claims the benefit of the filing date of U.S. Provisional Application No. 60/282,071 filed Apr. 6, 2001, the teachings of which are incorporated herein by reference.

FIELD OF THE INVENTION

The present invention relates to the optical transmission of information and, more particularly, to a method and apparatus for determining the location and amount of polarization dependent anomalies on an optical transmission path.

BACKGROUND OF THE INVENTION

The capacity of long-haul communication systems, such as "undersea" or "submarine" systems, has been increasing at a substantial rate. For example, some long-haul optically amplified undersea communication systems are capable of transferring information at speeds of 10 gigabits per second (Gbps) or greater in a single optical channel. In order to maximize the transmission capacity of an optical fiber network, a single fiber carries multiple optical channels in a process known as wavelength division multiplexing. For example, a single optical fiber might carry 64 individual optical signals in separate optical channels at corresponding wavelengths evenly spread in the low loss window of an optical fiber, for example between 1540 and 1564.8 nanometers (i.e., spread in channels on 0.4 nanometer centers).

Long-haul communication systems, however, are particularly susceptible to noise and pulse distortion given the relatively long distances over which the signals must travel (i.e., generally 600 to 12,000 kilometers). The performance of an optical transmission system is typically reported as a Q-factor of the signal. The Q-factor gives the electrical signal-to-noise ratio of the digital signal as it enters the receiver's decision circuit, which equivalently gives the bit error ratio of the signal. (Neal S. Bergano, F. W. Kerfoot, and C. R. Davidson, "Margin Measurements in Optical Amplifier Systems", Photonics Technology Letters, Vol. 5, No. 3, March 1993). Typically operators and owners of digital transmission systems require the system to operate with bit error ratios lower than $1 \times 10^{-10}$, which requires the Q-factor to be larger than 16 dB.

Polarization mode dispersion (or PMD) is a differential time of flight for different polarizations through an optical path such as a single-mode fiber. PMD can degrade the average performance of an optical transmission system, and can cause the performance to fluctuate with time. One of the deleterious manifestations of PMD is a degraded waveform or distortion that can change with time. Polarization dependent loss (or PDL) is a differential attenuation for different polarizations through an optical path, such as in an optical component. PDL can also degrade the average performance of an optical transmission system, and can cause the performance to fluctuate with time. One of the deleterious manifestations of PDL is a degraded signal-to-noise ratio that can change with time. Fluctuations in the performance caused by PMD and PDL require the system to operate with added margin to ensure satisfactory performance.

Typically, the added penalties caused by PMD and PDL are limited by placing specifications on the maximum, and average values of PMD and PDL in the system. However, because of the reality of modern manufacturing process, with small likelihood it is possible for highly localized polarization anomalies to be present in an optical transmission system. Once this occurs, it is difficult to locate a polarization anomaly in a manufactured system. Depending on the magnitude of the polarization anomaly, it is possible that the system could simply have a small degradation with little or no system impact. In an extreme case, however, the system could be rendered unusable.

Accordingly, there is a need for a system and method for ascertaining the location of a polarization dependent anomaly in optical communication systems.

SUMMARY OF THE INVENTION

A polarization anomaly locator system consistent with the invention includes: a transmitter configured to transmit a probe signal on a network including first and second optical transmission paths and a loop-back path for coupling at least a portion of the probe signal from the first transmission path to the second transmission path as a returned probe signal, and a receiver configured to receive the returned probe signal and to detect a polarization anomaly in the optical communication network in response to the returned probe signal. The location of the anomaly on the network may be determined from the distance the probe signal travels between the transmitter and the receiver. Also, a reference amount of a polarization anomaly may be provided in the probe signal for determining the amount or level of the anomaly in the network.

A method of detecting a polarization dependent anomaly in an optical network consistent with the invention includes: transmitting a probe signal on the network; receiving the probe signal from the network as a returned probe signal; and detecting the polarization anomaly in response to the returned probe signal. A method of approximating the level of a polarization dependent anomaly in an optical network consistent with the invention includes: transmitting a probe signal on the network; receiving the probe signal from the network as a returned probe signal; transmitting a reference probe signal on the network with a known reference anomaly; receiving the referenced probe signal from the network as a returned reference probe signal; and comparing the returned reference probe signal with the returned probe signal.

BRIEF DESCRIPTION OF THE DRAWINGS

For a better understanding of the present invention, together with other objects, features and advantages, reference should be, made to the following detailed description which should be read in conjunction with the following figures wherein like numerals represent like parts.

DETAILED DESCRIPTION

Figure 1:
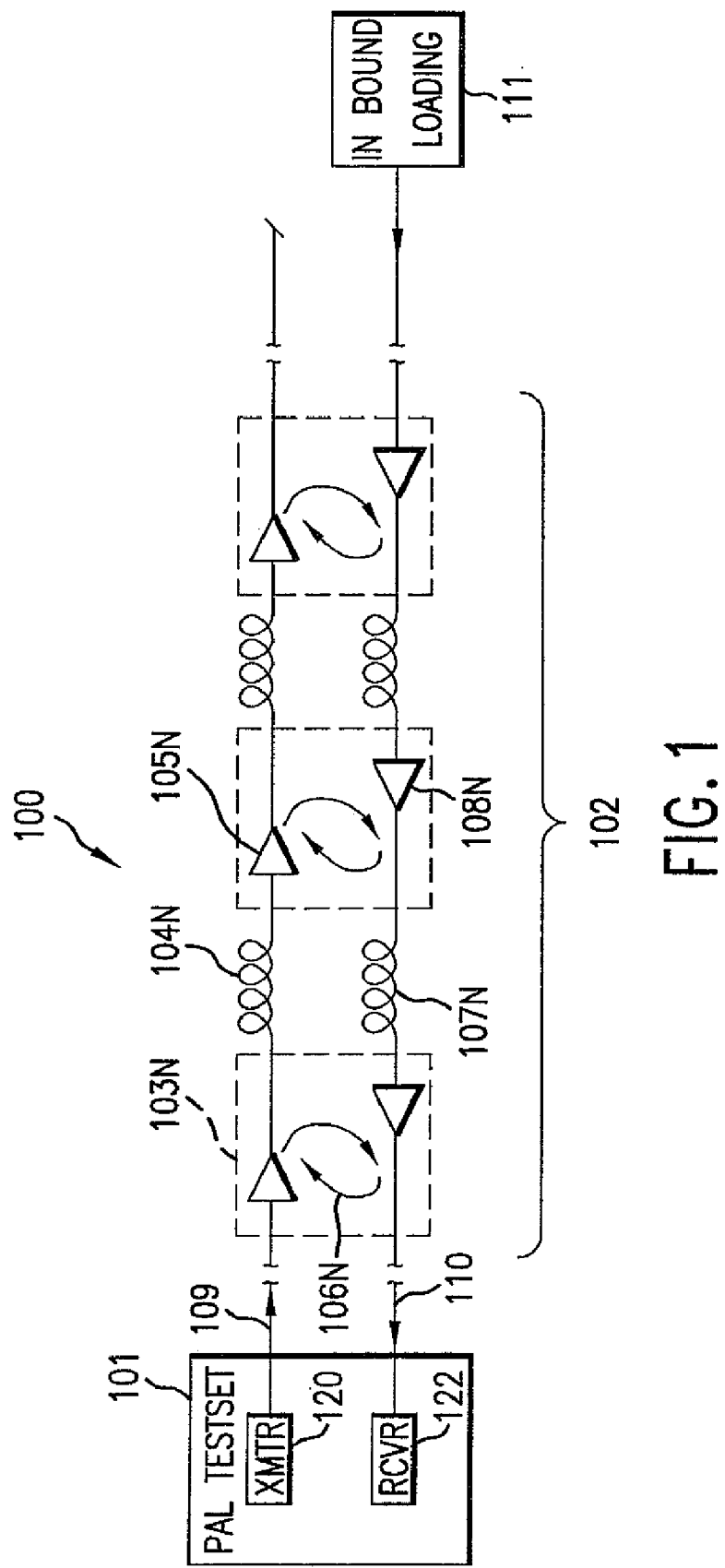
FIG. 1 schematically illustrates an exemplary polarization anomaly locator connected to an optical path consistent with the present invention.

FIG. 1 schematically illustrates an exemplary polarization anomaly locator ("PAL") system 101 consistent with the invention connected to an optical path 102. Those skilled in the art will recognize that the system 102 has been depicted as a highly simplified point-to-point system for ease of explanation. It is to be understood that the present invention may be incorporated into a wide variety of optical networks, systems, and optical amplifiers without departing from the spirit and scope of the invention.

In the illustrated embodiment, the system 100 includes an optical path shown as a fiber pair 102. One example of optical path 102 could be a fiber pair in an undersea cable. Depending on system characteristics and requirements, the optical fiber pair 102 may have a variety of components connected thereto, optical amplifiers, optical filters, and other active and passive components. A variety of configurations for each of these elements will be known to those skilled in the art.

For clarity, optical path 102 is illustrated as including amplifiers 105N and fiber paths 104N in the outbound direction and amplifiers 108N and fiber paths 107N in the inbound direction. Optical amplifiers 105N and 108N may be built in pairs 103N with a means to couple a fraction of the main transmitted signal onto the fiber path in the opposite direction via feedback paths 106N. A variety of feedback path configurations will be known to those skilled in the art. In one embodiment, the feedback paths may be configured as high-loss loop back paths, such as commonly used in the industry in connection with line monitoring equipment. Optical amplifiers 105N and 108N provide optical gain to compensate the attenuation in fibers 104N and 107N, and could, for example, be erbium-doped fiber amplifiers and/or Raman amplifiers, configurations of which are also well known to those skilled in the art.

In general, a probe signal generated in a PAL test set 101 is directed from a transmitter portion 120 to optical path 102 via path 109. This probe signal is coupled from the outbound path to the inbound path via feedback paths 106N located in the plurality of amplifier pairs 103N. The returning signals are directed into the PAL test set via path 110. The returning signal is received at a receiver portion 122 of the PAL test set and detected and compared to the transmitted signal to locate the localized polarization dependent anomaly. Optical loading equipment 111 may also be provided. The optical loading equipment may be a laser configured to provide an "inbound" loading signal that is used to reduce the noise level in the incoming direction to facilitate measuring the amplitude or phase modulation of the returned probe signal. In one embodiment, the inbound loading signal may be from a laser in a non-overlapping wavelength relative to the probe laser, yet in the optical pass-band of the system under test.

Figure 2:
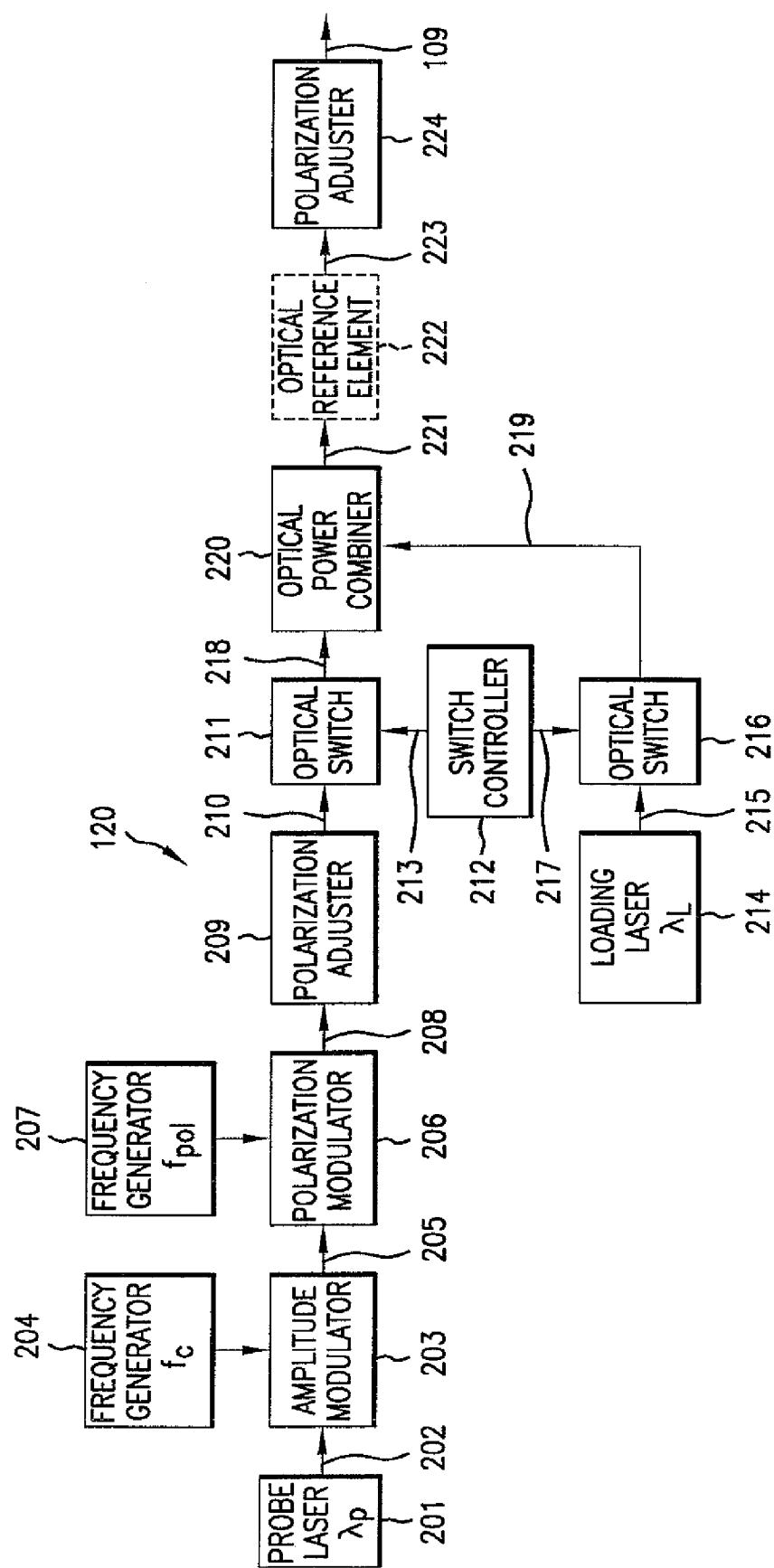
FIG. 2 is a block diagram of an exemplary embodiment of a transmitter portion for a polarization anomaly locator apparatus consistent with the invention.

FIG. 2 is a simplified block diagram of one exemplary embodiment 120 of a transmitter portion for a PAL test set 101 consistent with the invention. Those skilled in the art will recognize that a variety of transmitter configurations are possible. The expression "optically communicating" as used herein, refers to any connection, coupling, link, or the like, by which optical signals carried by one optical system element are imparted to the "communicating" element. Such "optically communicating" devices are not necessarily directly connected to one another, but may be separated by intermediate optical components or devices. In the illustrated exemplary embodiment, probe laser 201 generates a continuous wave (CW) optical signal at wavelength $\lambda_p$ onto path 202. Modulation section includes amplitude modulator 203 which modulates the intensity of signal 202 in accordance with an electrical signal ($f_c$) from frequency generator 204. In one embodiment of the invention, frequency generator 204 could provide a simple sinusoidal signal at 1 GHz, for example, to amplitude modulate the CW signal on path 202. Thus, the signal on path 205 would be an amplitude modulated optical signal with a sinusoidal intensity variation.

Modulation section further includes polarization modulator 206 which may be configured to modulate the state of polarization of the signal on path 205 in accordance with an electrical signal from frequency generator 207 at frequency ($f_{pol}$). In one embodiment of the invention, frequency generator 207 could provide a simple square wave signal at 1 MHz, for example, to polarization modulate the signal on path 205. In one mode of operation, modulator 206 and signal generator 207 could repetitively switch the state of polarization of signal 205 between two orthogonal polarizations at the 1 MHz rate. The average state-of-polarization of the signal on path 208 can be slowly changed by the polarization adjusters 209 and 224. Both polarization adjusters 209, 224 could be similar to the instrument manufactured by Agilent Technologies, device model number 11896A.

In one mode of operation, polarization adjuster 209 which optically communicates with polarization modulator 206 could be set to slowly scan through different polarizations presented on path 210 to average the effect of the polarization dependent anomaly under test. The signal on path 210 is then time gated (or switched on and off) by optical switch 211 in accordance by the control signal 213 that is generated by the switch controller 212. In one mode of operation, optical switch 211 and switch controller 212 could be used to switch signal 210 on for several tens of microseconds and then switch it off for many tens of milliseconds.

Loading laser 214 may generate CW optical signal at wavelength $\lambda_{load}$ onto path 215 that is at a non-overlapping wavelength from probe laser 201, yet in the optical pass-band of the system under test. The signal on path 215 may be time gated (or switched on and off) by optical switch 216 in accordance by the control signal on path 217 that is generated by the switch controller 212. In one embodiment, optical switch 216 and switch controller 212 could be used to switch the signal on path 215 off for several tens of microseconds and then switch it on for many tens of milliseconds and present this signal on 219. The optical signals on paths 218 and 219 are summed in optical power combiner 220, and the combined signal appears on optical path 221. The timing of the switches 211 and 216 may be arranged such that when one switch is on, the other is off so that the total power coming out of port 221 is nearly constant with time.

In one embodiment, it may be advantageous for probe laser 201 and loading lasers 111 and 214 to have a broadened spectral width to avoid stimulated Brillouin scattering in the path under test. In this case, any one of a number of standard practices could be used to broaden the linewidth, such as modulating the injection current to a semiconductor laser, or simply using a "Coherence Control" on commercially available tunable lasers, such as the OSICS external cavity laser made by GN Nettest.

The output of the power combiner may be provided directly to the polarization adjuster 224, or it may be provided to an intervening optical reference element 222. The optical reference element may take a variety of configurations. For example, the element may be configured to provide a known amount of PMD, i.e. the signal on path 221 passes through the element 222 onto path 223 at a delay dependent on its state of polarization. The element may alternatively be configured to provide a known amount of PDL, i.e. the signal path 221 passes through the element onto path 223 and is attenuated by an amount dependent on its state of polarization. The optical reference element 222 may also be configured to provide a known amount of PMD and PDL. Polarization adjuster 224 is coupled to the output of the optical reference element 222, or directly to the output of the combiner 220 in an embodiment without an optical reference element. In one embodiment, polarization adjusters 224 could be set to slowly scan through different polarizations presented on path 109 to average the strength of the polarization dependent anomaly under test. In another embodiment, the loading laser 214 could be removed.

Figure 3:
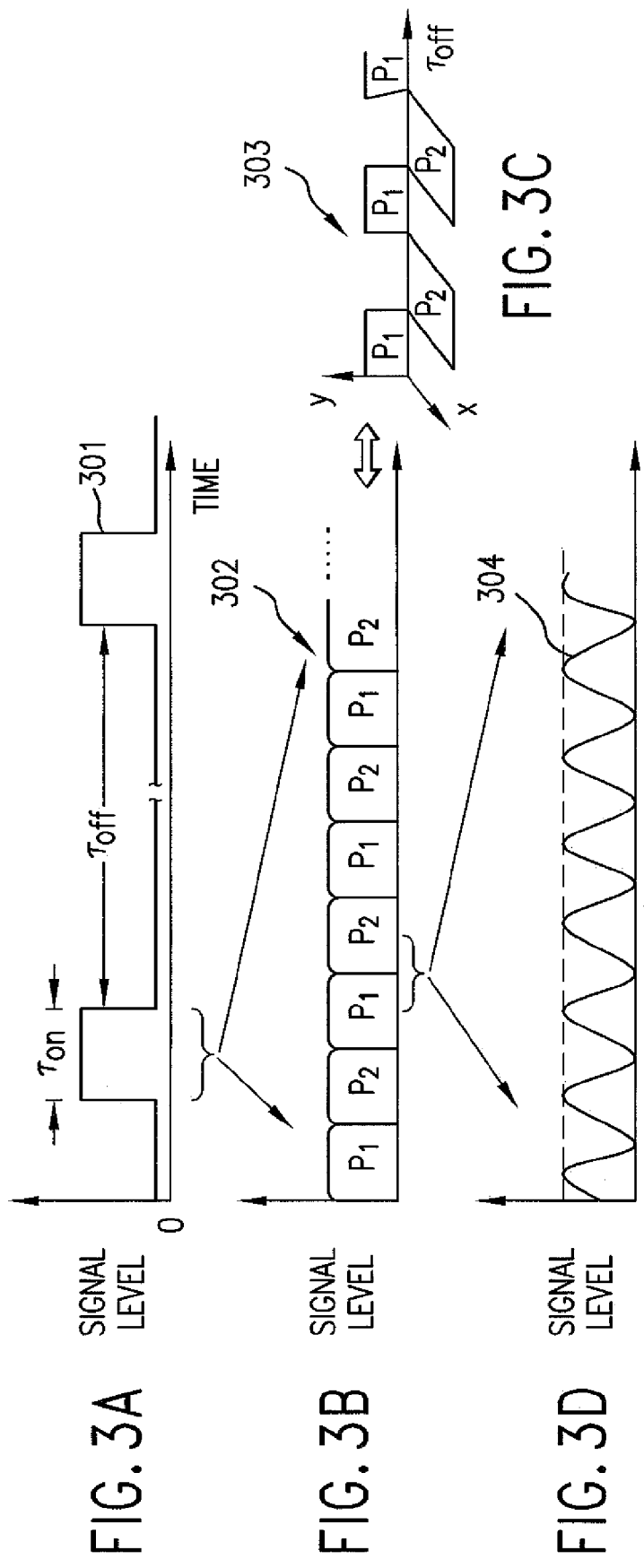
FIG. 3A is a plot of signal level vs. time for an exemplary probe signal consistent with the invention.
FIG. 3B is a plot of polarization vs. time for an exemplary $t_{on}$ portion of the probe signal illustrated in FIG. 3A.
FIG. 3C is a vector plot of polarization vs. time for the $t_{on}$ portion of the probe signal illustrated in FIG. 3B.
FIG. 3D is a plot of signal level vs. time for a carrier frequency component of an exemplary $t_{on}$ portion of the probe signal illustrated in FIG. 3A.

FIGS. 3A–3D illustrate an exemplary optical probe signal generated by transmitter 120 with no optical reference element 222 and launched into the system under test on path 109 at wavelength $\lambda_p$. In FIG. 3A, plot 301 illustrates signal level vs. time for the gated probe signal on a coarse time scale. The probe signal is gated to allow localization of polarization anomalies from one side of the optical path. In one embodiment, the probe signal at $\lambda_p$ may be turned on for a time period $\tau_{on}$ that does not exceed the minimum round trip time between any two-feedback paths in the system under test. For example, if the minimum amplifier 103 spacing was 45 kilometers, then the maximum period for $\tau_{on}$ would be 440 μsec (or the time of flight of an optical signal through 2×45 km of optical fiber). The probe signal at wavelength $\lambda_p$ may be switched off for a time period $\tau_{off}$ that is long enough that the returning probe signals do not overlap in time from one "shot" to another. This may be the time of flight from the PAL test set to the end of the system under test, and back. Thus, for a 10,000 km long system the minimum off time $\tau_{off}$ may be about 100 msec.

Plots 302 and 303 in FIGS. 3B and 3C, respectively, schematically illustrate the probe signal at wavelength $\tau_p$ to show the polarization modulation imparted on the signal by polarization modulator 206. Plot 302 illustrates optical power vs. time, and plot 303 shows the same waveform illustrated by plot 302, but drawn in vector form to illustrate the changing nature of the polarization. In the illustrated embodiment, the state of polarization is switched between two orthogonal polarizations $P_1$ and $P_2$. In one embodiment, the rate of change between $P_1$ and $P_2$ may be 1 MHz.

In operation, this polarization-modulated probe signal will acquire additional modulation when it encounters a polarization anomaly. For example, if the probe signal encounters a location in the path that has polarization dependent loss, the amplitude of the returning signal at the receiver 122 will acquire an amplitude modulation between $P_1$ and $P_2$. If the probe signal encounters a location in the path that has polarization mode dispersion, the time of flight between $P_1$ and $P_2$ would be altered such that the returning signal acquires a delay or phase modulation on top of the 1 GHz modulation.

Plot 304 in FIG. 3D is a plot of signal level vs. time for the probe signal at wavelength $\lambda_p$ to show the amplitude modulation imparted on the signal by amplitude modulator 203. In this example, the amplitude is modulated with a sinusoidal waveform at a rate, which may be about 1 GHz in one embodiment. This sinusoidal modulation serves as a carrier frequency to aid in the detection of an added amplitude modulation and/or phase modulation.

Figure 4:
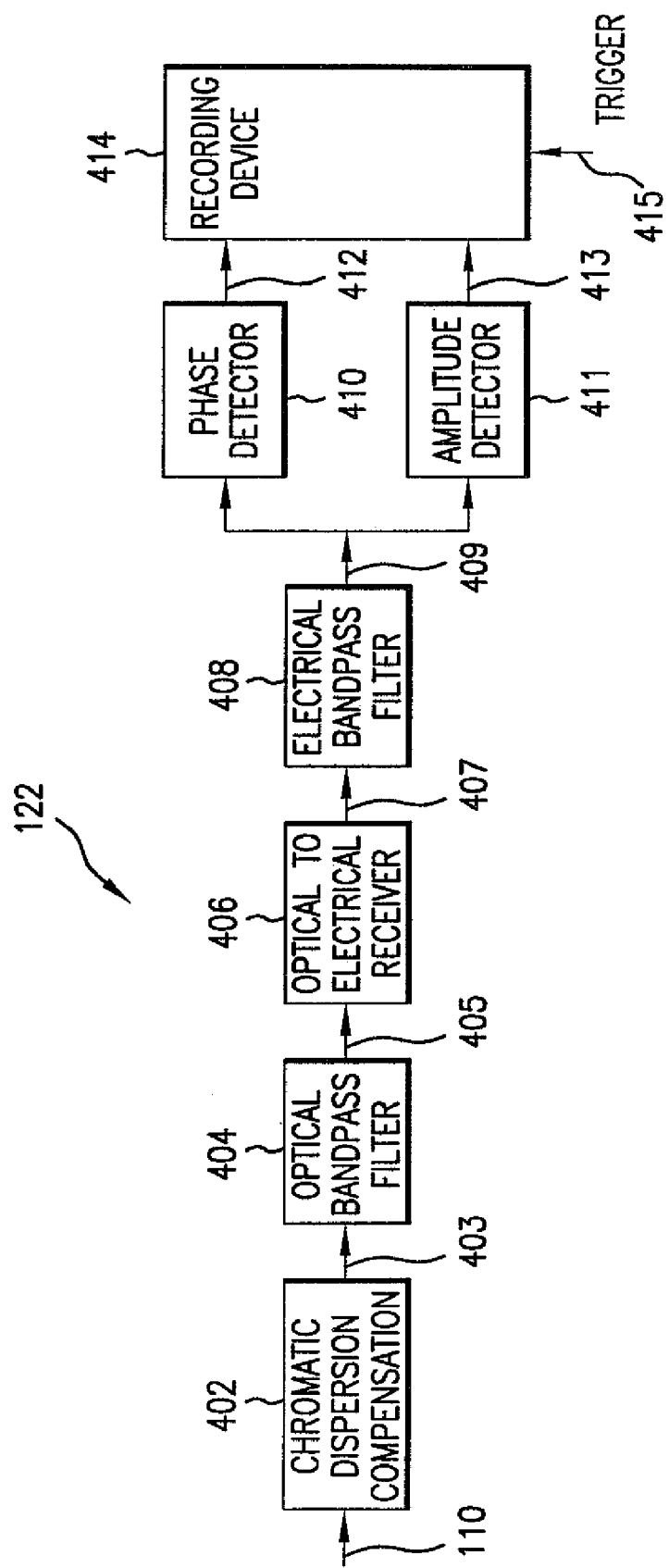
FIG. 4 is a block diagram of an exemplary embodiment of a receiver portion for a polarization anomaly locator apparatus consistent with the invention.

FIG. 4 is a block diagram of one exemplary embodiment 122 of the receiver portion of a PAL test set 101 consistent with the invention. The receiver portion 122 receives a signal on the incoming direction from the system on path 110. Those skilled in the art will recognize that a receiver 122 consistent with the invention may be provided in a variety of configurations.

In the illustrated exemplary embodiment 122, the incoming signal on path 110 is provided to a chromatic dispersion compensation unit 402, which compensates for accumulated chromatic dispersion that is found on the optical path under test. A variety of dispersion compensating configurations, e.g. dispersion compensating fiber, are known to those skilled in the art. Also, in the illustrated embodiment the chromatic dispersion compensation unit 402 is provided at the receive side of the apparatus. As is known to those skilled in the art, the chromatic dispersion could also be split between the transmit side and the receive side. For example, in some embodiments it may be advantageous to split the required dispersion compensation with approximately 50% at the transmitter, and 50% at the receiver. In other embodiments it may be adequate to put all of the compensation at the transmit side of the apparatus.

The dispersion compensated signal on path 403 is coupled to an optical bandpass filter 404, which is tuned to pass the probe wavelength at $\lambda_p$, and block other signals. Optical receiver 406 then converts the filtered optical signal on path 405 to an electrical signal on path 407. The optical receiver 406 may take a variety of known configurations such as a simple amplitude detector. The electrical signal on path 407 is coupled to an electrical bandpass filter 408 that has a center frequency tuned to the same frequency as generator 204. The bandpass filter 408 may be used to enhance the signal-to-noise ratio of signal 407 by reducing the noise bandwidth of signal 409. The bandwidth of filter 408 should, however, be chosen to be wide enough to pass any modulation created at the polarization modulation frequency given by generator 207.

The band-limited signal on path 409 is directed to a phase detector 410 and an amplitude detector 411. Phase detector 410 may be configured to detect any phase modulation on the carrier frequency (set by generator 204), occurring at the polarization modulation frequency (set by generator 207). Amplitude detector 411 may be configured to detect any amplitude modulation on the carrier frequency (set by generator 204), occurring at the polarization modulation frequency (set by generator 207).

The detected phase modulation on path 412 and the detected amplitude modulation on path 413 may be logged by recording device 414. Recording device 414 may be provided in a variety of configurations. In one embodiment the recording device 414 may be a digital oscilloscope. The trigger signal 415 for a digital oscilloscope recording device may be generated by switch controller 212 and could, for example, be a similar signal to 213. If the type of polarization anomaly is known beforehand, it is possible that only one of detectors 410, 411 would be needed. For example, if the apparatus were being used to locate PMD, then the amplitude detector 411 would not be needed.

Figure 5:
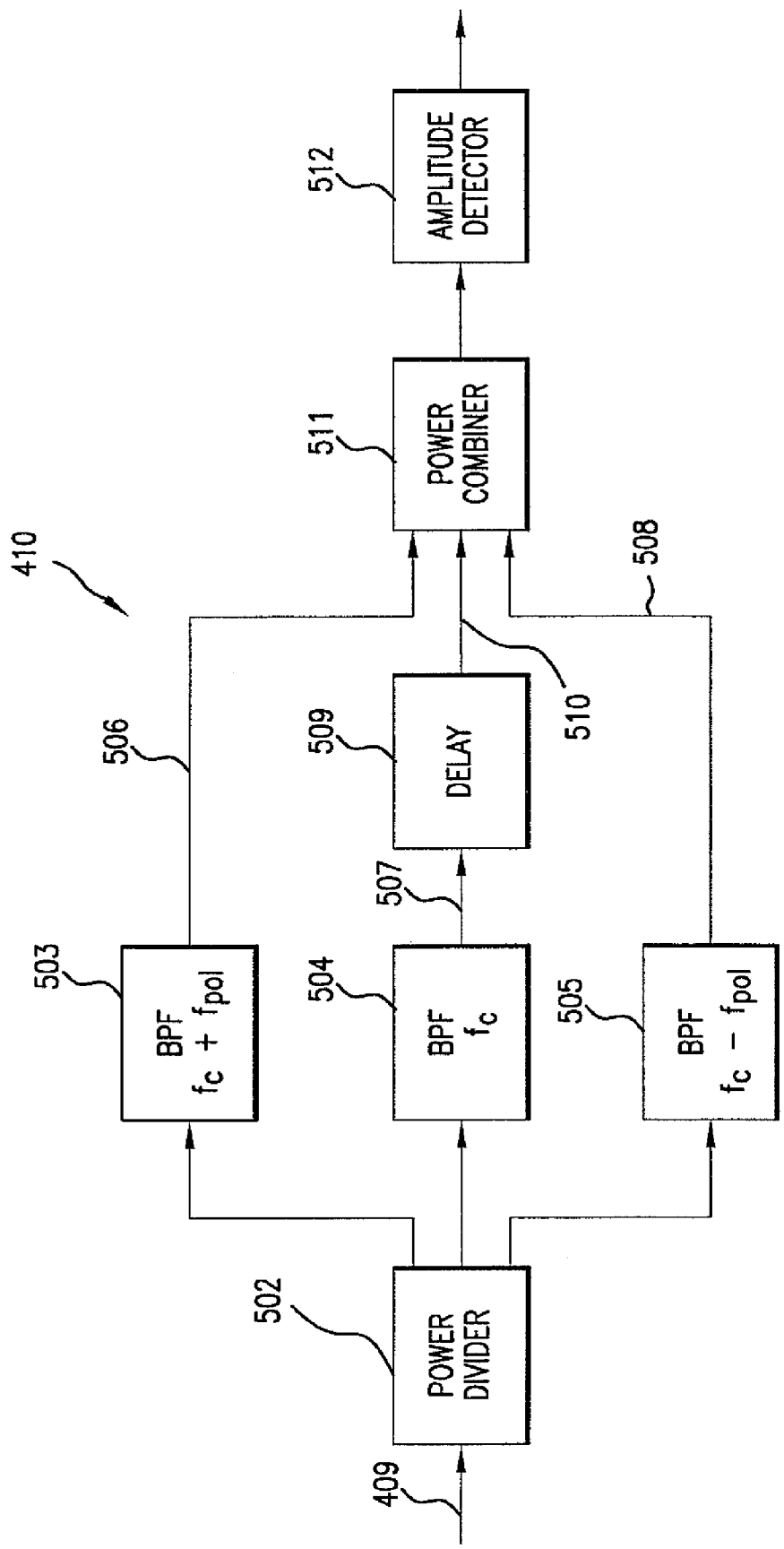
FIG. 5 is a block diagram of an exemplary embodiment of a phase detector circuit for use in a receiver portion of a polarization anomaly locator apparatus consistent with the invention.

FIG. 5 is a block diagram of one exemplary embodiment 410 of a phase detector useful in a receiver consistent with the invention. Those skilled in the art will recognize that the phase detector may be provided in a variety of configurations. In the illustrated exemplary embodiment, the electrical phase modulation on carrier frequency $f_c$ at the rate of the polarization modulation $f_{pol}$ is converted from phase modulation to amplitude modulation with the illustrated phase modulation to amplitude modulation (PM/AM) converter. Incoming electrical signal on path 409 is divided into substantially identical signals by power divider 502. These signals are coupled to associated bandpass filters 503, 504, and 505. Bandpass filter 503 has a center frequency of $f_c+f_{pol}$, bandpass filter 504 has a center frequency of $f_c$, and bandpass filter 505 has a center frequency of $f_c-f_{pol}$. The bandwidth of each of these three filters is wide enough to pass any temporal information that occurs at rates associated with the round trip time between repeater sights 103N. The bandwidth of each of these three filters is narrow enough such that they do not overlap, and thus provide harmonic rejection, and noise suppression. The signal emerging on line 507 from filter 504 at $f_c$ is delayed by one quarter of a wave at the carrier modulation frequency, or $1/(4f_c)$ in delay element 509 with respect to the signals on lines 506 and 508. This delayed signal on 510 is summed with signals 506 and 508 in power combiner 511. Amplitude detector 512 detects the signal emerging from the power combiner 511. The amplitude detector may be provided in a variety of configurations, and may have configuration similar to that of the recording device 414.

Figure 6:
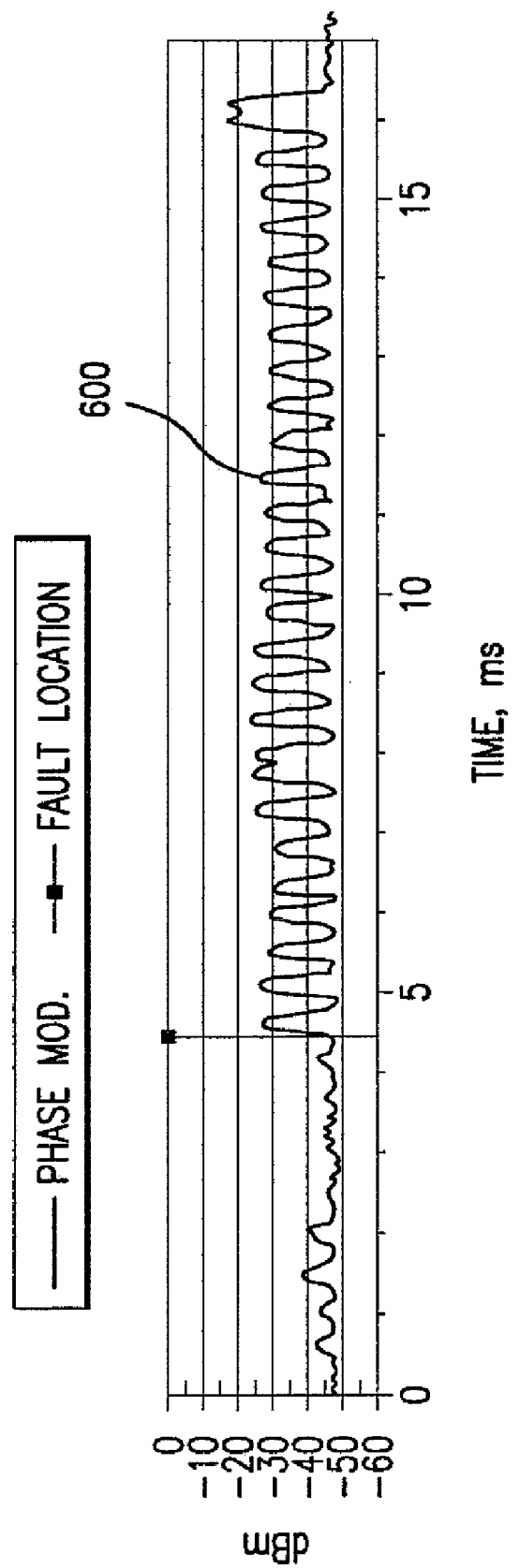
FIG. 6 is a plot of phase modulation level vs. time for a probe signal returned through an optical path from a transmitter to a receiver in a polarization anomaly locator apparatus consistent with the invention.

FIG. 6 is a plot 600 of the average phase modulation of the carrier frequency $f_c$ at the rate of polarization modulation $f_{pol}$ for a system consistent with the invention. The average phase modulation provides a measurement related to round-trip polarization mode dispersion. The phase modulation is illustrated in FIG. 6 as a function of time, which is equivalent to distance along the system under test (where the time axis and distance are related through the speed of light through the optical path). In an embodiment wherein probe signal pulses are shorter than the largest round trip delay of the amplifier spans, most of the signal returned from the system is a series of separate pulses, each from a successive span.

An instructive feature of plot 600 is the level of the returned signal in the "center" of each return pulse, or the signal level at the appropriate delay corresponding to the position of each feedback stage. Plot 600 illustrates a low value of phase modulation up until a delay value of about 4.5 msec, where the signal transitions from a low level to a high level. This clearly indicates the position of the localized polarization anomaly to be between the last reflection with the low value, and the first reflection with the high phase modulation value. This 4.5 msec delay corresponds to a distance of about 460 km from the measurement end, since light travels about 4.89 μsec/km in fiber and 4.5 msec is the round-trip time from the measurement end to the localized polarization dependent delay and/or loss and back.

The data for plot 600 may be recorded by averaging over many launch states of polarization while constantly accumulating data (i.e., changing the polarization adjusters 209 and/or 224 during the measurement). In another embodiment, it may be advantageous to record a set of data that look similar to that in plot 600, but is recorded with a fixed launch state of polarization for each element in the set. In this embodiment the polarization adjusters 209 and/or 224 would be held fixed while data is accumulated and recorded. Then, between measurements, the launch state of polarization is changed to a different fixed state and then the data accumulation is repeated. This procedure may be repeated to build a data set where different analyses could be performed. For example, the standard deviation of the received signal could be displayed as a function of distance, which would indicate the location of a fault. Alternatively, a correlation analysis may be used to compare the received signal over different feedback paths.

Optical reference element 222 in FIG. 2 may be used to estimate the amount of localized polarization dependent delay and/or loss (also called a fault) in the optical transmission path. In one embodiment, the measurement may be performed with no optical reference element to determine the modulation response immediately after the fault. Then, various fault values of optical reference elements can be inserted and measurements performed. If the modulation response for the amplifier immediately before the fault when an optical reference element is inserted equals the modulation response for the amplifier immediately after the fault, then the value of the fault is approximated by the fault value of the inserted optical reference element.

Figure 7:
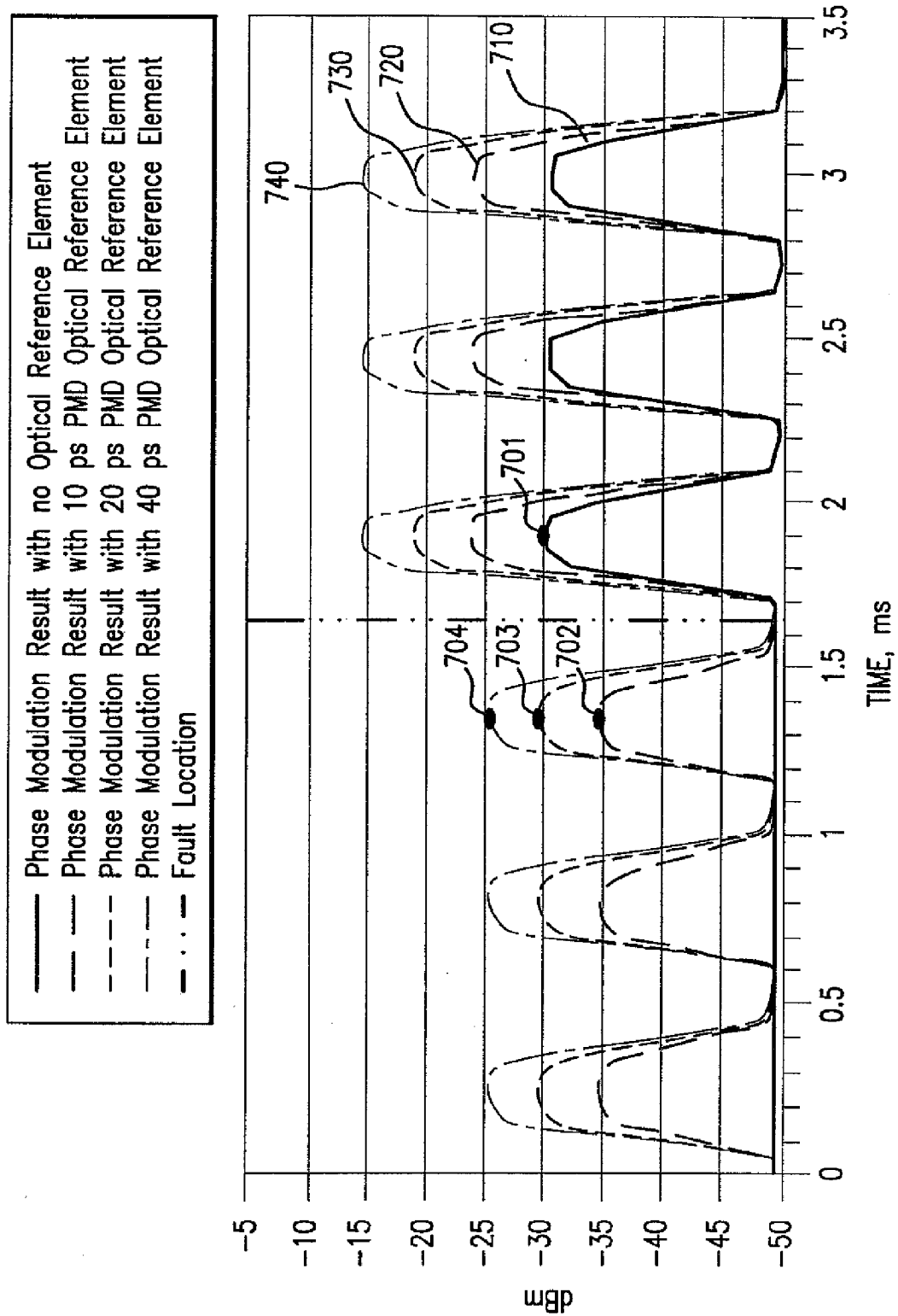
FIG. 7 is a plot of phase modulation level vs. time for a probe signal returned through an optical path from a transmitter to a receiver in a polarization anomaly locator apparatus consistent with the invention when different amounts of PMD are added at the terminal for reference purposes.

For example, FIG. 7 illustrates average phase modulation level vs. time for system consistent with the invention wherein a 20 ps PMD is fault located in the transmission path. Plot 710 illustrates average phase modulation when no optical reference element 222 in the system, and shows the fault occurring at about 1.65 ms. Point 701 represents the response immediately after the fault in the optical transmission. Plots 720, 730, and 740 illustrate average phase modulation when an optical reference element 222 having a 10 ps, 20 ps, and 40 ps PMD value, respectively, are inserted in the system. Points 702, 703 and 704 represent the response for the amplifier immediately before the fault in the optical transmission path with optical reference elements of PMD values 10, 20 and 40 ps, respectively. In this example, the phase modulation response at point 703 matches the phase modulation response of point 701. The fault in the transmission path is thus estimated to be approximately 20 ps.

There is thus provided a method and apparatus for detecting localized polarization dependent anomalies in optical transmission lines. A polarization dependent delay and/or loss may be detected from one end of an optical transmission path by applying a polarization modulated probe signal to an outgoing optical fiber, and detecting the received signal that is fed back through optical loop-back paths along the system. The probe signal may be generated by modulating the amplitude of an optical signal at a predetermined rate, and modulating the polarization of the optical signal at a predetermined rate, then remodulating this continuous signal to form a pulse. This probe signal propagates along the optical path, and is returned via optical feedback sites located along the cable. When the probe signal encounters a polarization dependent delay and/or loss, it acquires an additional phase and/or amplitude modulation. The probe signal that is returned via an incoming fiber is detected, and compared to the timing of the transmitted signal to measure the location of the localized polarization-dependent anomaly. Reference amounts of polarization dependent delay and/or loss can be inserted into the transmitter and measurements performed to estimate the amount of localized polarization dependent delay and/or loss in the optical transmission path.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. A polarization anomaly locator system for an optical communication network, said system comprising:
a transmitter configured to transmit a probe signal on a network having first and second optical transmission paths and a loop-back path, said first and second optical transmission paths supporting communication of optical signals in opposite directions on said network, said loop-back path coupling at least a portion of said probe signal from said first transmission path to said second transmission path as a returned probe signal; said transmitter having a modulation section optically communicating with said probe signal source, said modulation section configured to impart a depth of modulation on said probe signal at a particular frequency and comprising
an amplitude modulator configured to modulate the amplitude of said probe laser output signal at a carrier frequency, and
a polarization modulator configured to modulate the polarization of said probe laser output signal at a polarization frequency,
said amplitude and polarization modulators thereby providing a modulated probe laser output signal,
said transmitter further comprising:
an optical switch configured to selectively switch said modulated probe laser output signal onto an optical path in response to a control signal,
a loading laser configured to provide a loading signal,
a loading laser optical switch configured to switch said loading signal on a loading signal optical path in response to a loading laser control signal, and
a power combiner configured to combine optical power on said optical path and said loading signal optical path as a power combiner output; and
a receiver coupled to said second transmission path and configured to receive said returned probe signal and to provide an output indicating an approximate position of a polarization anomaly in said optical communication network in response to said returned probe signal.

2. A system according to claim 1, wherein said control signal is configured to switch said optical switch to an on state when said loading laser optical switch is in a closed state and to switch said optical switch to an off state when said loading laser optical switch is in an open state.

3. A system according to claim 1, wherein a frequency of said loading signal is in an optical pass band of said network and different from a frequency of said probe laser output signal.

4. A system according to claim 1, wherein said transmitter further comprises an optical reference element configured to provide a reference anomaly level to said power combiner output.

5. A system according to claim 4, wherein said transmitter further comprises a polarization adjuster configured to adjust an average state of polarization of an output of said optical reference element.

6. A system according to claim 1, wherein said transmitter further comprises an optical reference element, and wherein said probe signal includes a reference anomaly level imparted by said optical reference element.

7. A system according to claim 6, wherein said reference anomaly level comprises a predetermined level of polarization dependent loss.

8. A system according to claim 6, wherein said reference anomaly level comprises a predetermined level of polarization mode dispersion.

9. A system according to claim 1, wherein said receiver comprises a chromatic dispersion compensator for receiving said returned probe signal and compensating for accumulated chromatic dispersion.

10. A system according to claim 1, wherein said polarization anomaly is polarization dependant loss and wherein said receiver comprises an amplitude detector configured to detect said polarization dependent loss by detecting an amplitude of a signal representative of said returned probe signal.

11. A system according to claim 1, wherein said polarization anomaly is polarization mode dispersion and wherein said receiver comprises a phase detector configured to detect said polarization mode dispersion by detecting phase modulation of a signal representative of said returned probe signal.

12. A system according to claim 11, wherein said phase detector comprises a PM to AM converter.

13. A system according to claim 1, further comprising an inbound loading laser optically communicating with said second transmission path, said loading laser configured to reduce a noise level associated with the second transmission path.

14. A polarization anomaly locator system for an optical communication network, said system comprising:
a transmitter configured to transmit a probe signal at a carrier frequency and modulated at a polarization modulation frequency on a network having first and second optical transmission paths and a loop-back path, said first and second optical transmission paths supporting communication of optical signals in opposite directions on said network, said loop-back path coupling at least a portion of said probe signal from said first transmission path to said second transmission path as a returned probe signal; said transmitter having a modulation section optically communicating with said probe signal source, said modulation section configured to impart a depth of modulation on said probe signal at a particular frequency; and
a receiver coupled to said second transmission path and configured to receive said returned probe signal and to provide an output indicating an approximate position of polarization mode dispersion in said optical communication network in response to said returned probe signal., said receiver comprising a phase detector configured to detect said polarization mode dispersion by detecting phase modulation of a signal representative of said returned probe signal, said phase detector comprising a PM to AM converter, said PM/AM converter comprising: a power divider for dividing said signal representative of said returned probe signal onto first, second, and third optical paths, said first optical path including a first band pass filter having a pass band centered on a frequency substantially equal to said carrier frequency plus said polarization modulation frequency, said second optical path including a second band pass filter having a pass band centered on a frequency substantially equal to said carrier frequency and a delay element for delaying an output of said second band pass filter, and said third optical path comprising a third band pass filter having a pass band centered on a frequency substantially equal to said carrier frequency minus said polarization modulation frequency; and a power combiner for combining output power from said first band pass filter, said delay element, and said third band pass filter.

15. A system according to claim 14, wherein said probe signal is amplitude modulated and polarization modulated.

16. A system according to claim 14, wherein said probe signal is amplitude modulated.

17. A system according to claim 14, wherein probe signal is polarization modulated.

18. A system according to claim 1, wherein said amplitude modulator is configured to modulate the amplitude of said probe laser output signal to provide sinusoidal intensity variation of said probe laser output signal at said carrier frequency.

19. A system according to claim 1, wherein said polarization modulator is configured to polarization modulate said probe laser output signal to provide switching of the polarization state of said probe laser output signal between substantially orthogonal states of polarization at said polarization frequency.

20. A system according to claim 1, wherein said transmitter further comprises a polarization adjuster configured to adjust an average state of polarization of said modulated probe laser output signal.

21. A polarization anomaly locator system for an optical communication network, said network having first and second optical transmission paths and a loop-back path, said system comprising:
a transmitter configured to transmit a probe signal on said network, said loop-back path coupling at least a portion of said probe signal from said first transmission path to said second transmission path as a returned probe signal, said transmitter comprising
a modulation section optically communicating with said probe signal source, said modulation section configured to impart a depth of modulation on said probe signal at a particular frequency and comprising an amplitude modulator configured to modulate the amplitude of said probe laser output signal at a carrier frequency, and a polarization modulator configured to modulate the polarization of said probe laser output signal at a polarization frequency, said amplitude and polarization modulators thereby providing a modulated probe laser output signal,
an optical switch configured to selectively switch said modulated probe laser output signal onto an optical path in response to a control signal,
a loading laser configured to provide a loading signal,
a loading laser optical switch configured to switch said loading signal on a loading signal optical path in response to a loading laser control signal, and
a power combiner configured to combine optical power on said optical path and said loading signal optical path as a power combiner output; and
a receiver coupled to said second transmission path and configured to receive said returned probe signal and to detect a polarization anomaly in said optical communication network in response to said returned probe signal.

22. A system according to claim 21, wherein said control signal is configured to switch said optical switch to an on state when said loading laser optical switch is in a closed state and to switch said optical switch to an off state when said loading laser optical switch is in an open state.

23. A system according to claim 21, wherein a frequency of said loading signal is in an optical pass band of said network and different from a frequency of said probe laser output signal.

24. A system according to claim 21, wherein said transmitter further comprises an optical reference element configured to provide a reference anomaly level to said power combiner output.

25. A system according to claim 24, wherein said transmitter further comprises a polarization adjuster configured to adjust an average state of polarization of an output of said optical reference element.

26. A polarization anomaly locator system for an optical communication network, said network having first and second optical transmission paths and a loop-back path, said system comprising:
a transmitter configured to transmit a probe signal on said network, said loop-back path coupling at least a portion of said probe signal from said first transmission path to said second transmission path as a returned probe signal; said transmitter having a modulation section optically communicating with said probe signal source, said modulation section configured to impart a depth of modulation on said probe signal at a particular frequency; and
a receiver coupled to said second transmission path and configured to receive said returned probe signal and to detect polarization mode dispersion in said optical communication network in response to said returned probe signal, said receiver comprising a PM to AM converter configured to detect said polarization mode dispersion by detecting phase modulation of a signal representative of said returned probe signal,
wherein said probe signal is transmitted at a carrier frequency and modulated at a polarization modulation frequency, and wherein said PM/AM converter comprises: a power divider for dividing said signal representative of said returned probe signal onto first, second, and third optical paths, said first optical path including a first band pass filter having a pass band centered on a frequency substantially equal to said carrier frequency plus said polarization modulation frequency, said second optical path including a second band pass filter having a pass band centered on a frequency substantially equal to said carrier frequency and a delay element for delaying an output of said second band pass filter, and said third optical path comprising a third band pass filter having a pass band centered on a frequency substantially equal to said carrier frequency minus said polarization modulation frequency; and a power combiner for combining output power from said first band pass filter, said delay element, and said third band pass filter.

* * * * *